UNITED STATES PATENT OFFICE.

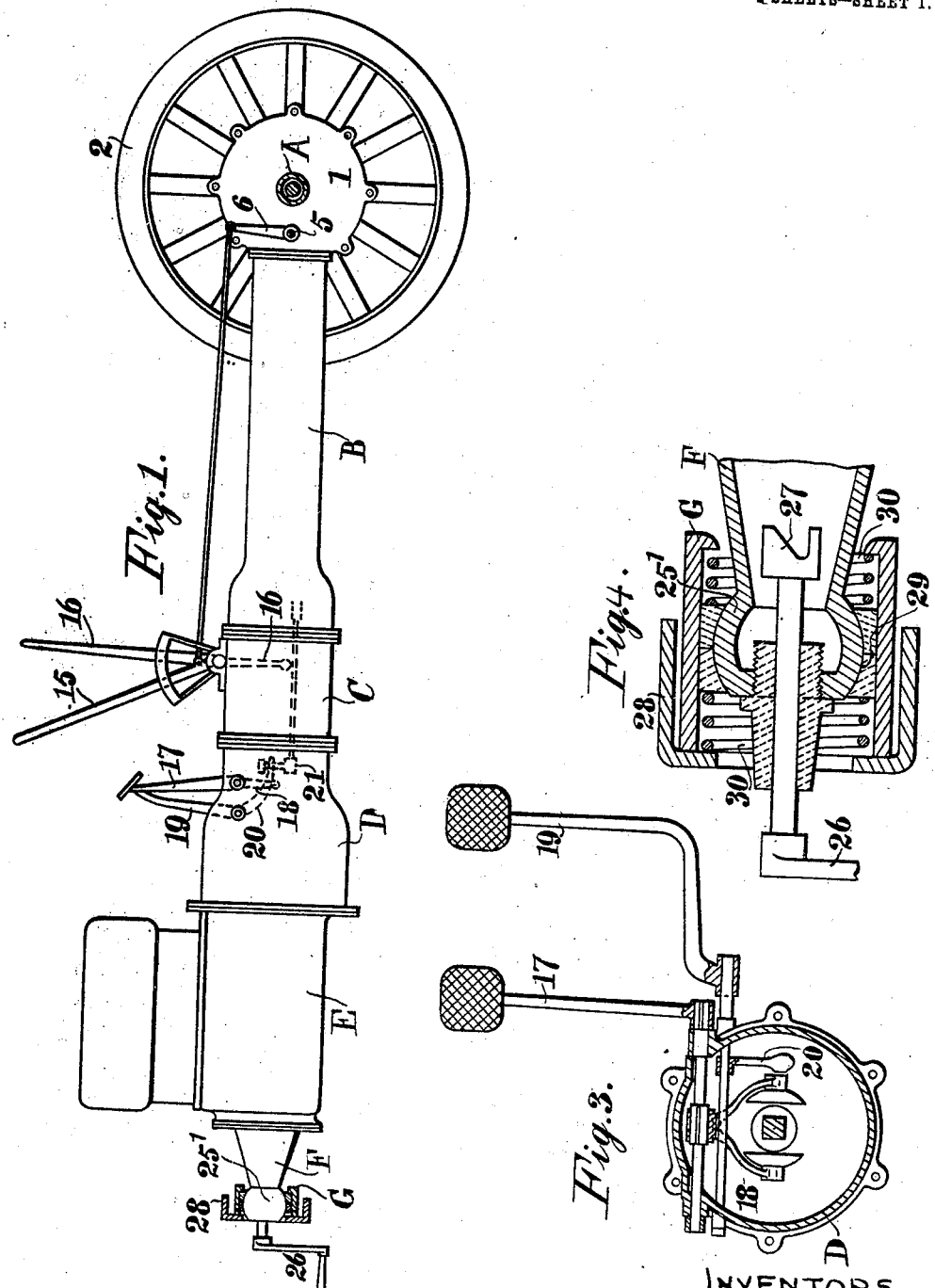

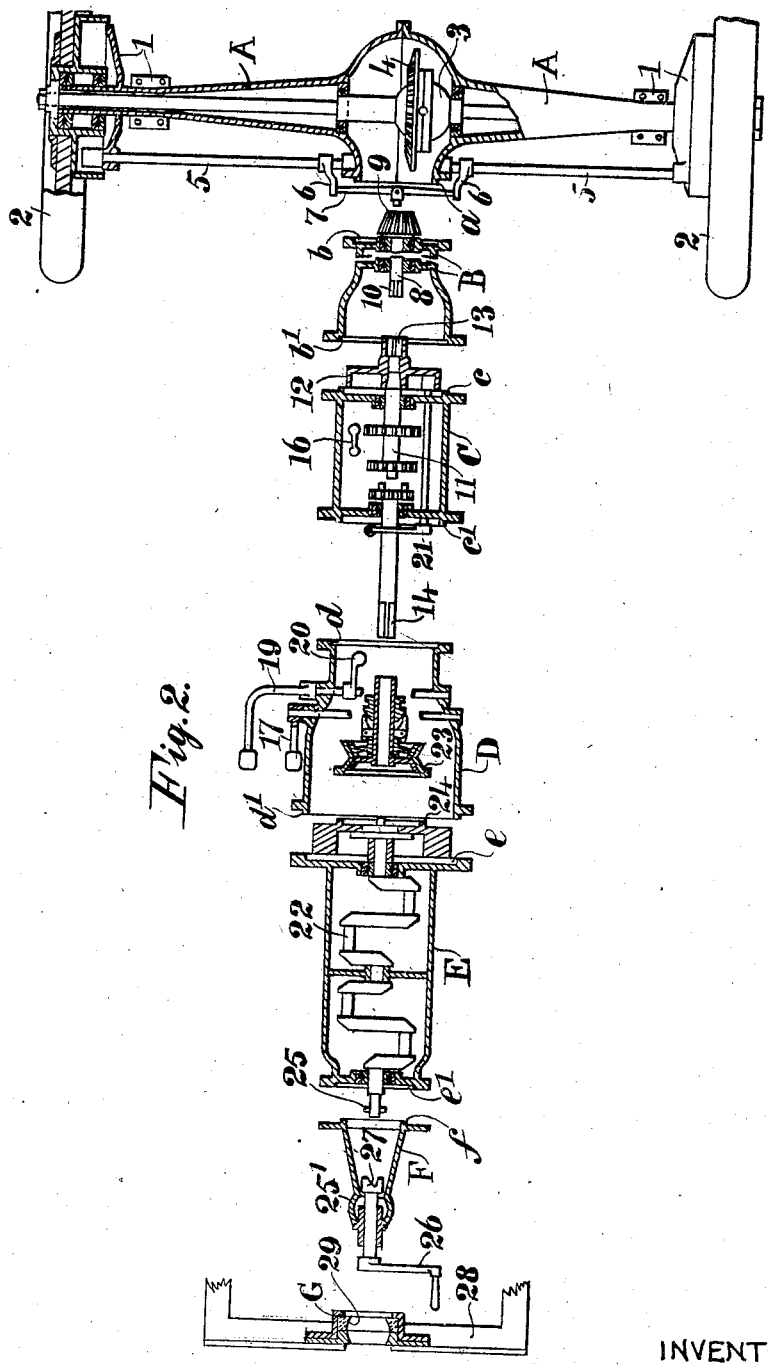

ELIE LACOSTE AND EMILE BATTMANN, OF PARIS, FRANCE.

PROPELLING MECHANISM FOR MOTOR-VEHICLES.

959,231.

Specification of Letters Patent.   Patented May 24, 1910.

Application filed December 14, 1909.   Serial No. 533,123.

*To all whom it may concern:*

Be it known that we, ELIE LACOSTE and EMILE BATTMANN, both citizens of the Republic of France, residing at Paris, Department of the Seine, Republic of France, have invented certain new and useful Improvements in Propelling Mechanism for Motor-Vehicles, of which the following is a specification.

This invention refers to a complete propelling mechanism for motor vehicles, offering considerable economy and facility in its manufacture, putting together, taking to pieces and transporting. The taking to pieces and assembling is effected with very little trouble and without any adjusting, at the same time the device assures perfect alinement of the various parts and forms a dust-tight casing for them. Furthermore, according to this arrangement, the moving parts are protected and their lubrication is assured, the various parts having to support the minimum strain and wear possible.

This invention consists in arranging the various propelling mechanisms of motor vehicles in a series of casings each forming a complete group independent of the others, each group possessing all its controlling parts. The casings of these various groups are adjusted coaxially with each other by means of tongue and groove joints formed on the ends of the casings and thus are connected up to form a rigid block. The coupling up of the various casings with each other also couples up the mechanisms contained in the same, the parts of one group penetrating into the corresponding parts of the adjoining group, so as to form a line of transmission shafts coaxial with the tongue and groove joints of the casings and consequently in the theoretical prolongation of each other.

One of the chief characteristics of this invention consists in forming as above described a complete automotor mechanism from the back wheels to the starting crank, the mechanism being provided with all its controlling parts, such as pedals, levers and the like and terminating in front by a hollow spherical portion, by means of which the propelling effort of the driving wheels is transmitted to the body of the vehicle through an elastic spherical bearing provided on the front of the body of the vehicle. Thus as the automotor mechanism contains all its controlling parts, it is possible to connect this mechanism almost instantaneously to the body of the vehicle, just as a horse is harnessed up, that is to say by engaging the front spherical or ball portion in the bearing provided on the front crossbar of the body of the vehicle and by bolting the springs of the body at the back on to the supports or shoulder of the back axle-tree. This arrangement can be adapted to all kinds of bodies, whatever may be their shape or length, it only being necessary to vary the length of the connecting casing and of the transmission shaft.

Referring to the accompanying drawings:—Figure 1 shows in elevation the automotor propelling mechanism. Fig. 2 is a plan view of the automotor mechanism, the different groups of mechanism being shown in section and separated from each other. Fig. 3 is a cross-section on an enlarged scale of the connecting up mechanism D. Fig. 4 is a section on an enlarged scale of the front ball joint, showing for the sake of example an arrangement rendering the bearing elastic in a longitudinal direction.

As may be seen from the drawings the back axle is formed by a casing A A, provided with spring and brake supports 1 and the hubs with their wheels 2. The differential 3 and its driving bevel wheel 4 is situated inside this casing. The levers 6 with the connecting bar 7 for actuating the hub brakes are arranged on the shafts 5 outside the casing A. This casing terminates in side the casing A. This casing terminates in a circular projecting tongue $a$. The grooves $b, b'$ are formed in the ends of the connecting casing B, the transmission shaft 8 passing through the casing coaxially with the circular grooves $b, b'$. This shaft 8 is terminated at one end by the pinion 9 which meshes with the driving bevel wheel 4, and at the other end by a square head 10 which can engage in a corresponding recess of the brake pulley of the change-speed gear. The change-speed gear consists of a casing C provided at either end with projecting circular tongues $c, c'$ which exactly engage in the corresponding grooves of the adjoining casings B and D. The main shaft 11 of the change-speed gear turns in the interior of this casing coaxially with the tongues $c, c'$. This shaft 11 terminates at its back portion by the brake pulley 12, in the square recess 13 of which, the square head 10 of the transmission shaft can engage; the other end of this shaft 11 is terminated by a square head 14 which can engage in a corresponding recess formed in the connecting-up cone. The casing C also supports the lever 15 controlling the brakes of the back wheels, as well as the change-speed lever 16. This lever 16 penetrates directly to the interior of the change-speed gear so as to control the gear wheels without the use of any intermediary part. It should be remarked that the lever 16 is connected to the casing C by a ball and socket joint, so that this lever can pivot both in a lateral as well as in a longitudinal direction, so as to control the two change-speed gear wheels, the penetration into the casing being rendered dust-tight by the ball portion.

The connecting up or clutch mechanism consists of a casing D terminating at one end by a groove $d$ and at the other end by a tongue $d'$ coaxially with each other. The connecting-up cone carried by the shaft 11 of the change-speed gear turns at the interior of this casing D coaxially with these tongues and grooves; the square head 14 of the shaft 11, when connecting up the casings, engaging a square recess formed in the connecting-up cone. The casing D carries the pedal 17 directly controlling the connecting-up cone by means of the fork 18. The casing D also carries the brake pedal 19 which, by means of the levers 20, 21 arranged at the interior, controls the brake of the change-speed gear situated in the pulley 12, the holes through which the shafts of the pedals 17 and 19 penetrate into the casing are rendered dust-tight.

The mechanism of the motor is situated in a casing E and its crank 22 turns coaxially with the grooves $e$, $e'$ in the ends of this casing. This casing also carries the carbureter, the magneto, the lubricating pipes, the fan, not shown, all controlled directly by this engine.

The female cone 23 of the connecting up mechanism is centered on a circular tongue 24 of the fly-wheel and the crank is terminated at the other end by a prolongation provided with a starting pin 25.

The starting mechanism consists of a casing F at the back of which is formed a tongue $f$ which engages in the groove of the motor-casing E. The casing F terminates in front in a ball portion 25' coaxial with the tongue $f$. The starting shaft, terminated in front by the crank 26 and at the back by the clutch 27, can turn in the interior of this casing F. Finally the casing G of the bearing in two pieces with spherical boring 29 can be fitted to the front cross-bar 28 of any vehicle body. The ball portion of the casing F can turn freely in all directions in the interior of this bearing 29 without any effort and coaxially with all the mechanism, and can transmit to the body of the vehicle the thrust exerted by the back wheels through all the casings.

In order to check the shocks or vibrations resulting from the back wheels traveling over uneven ground, compensating springs 30 are provided on each side of the bearing and permit the bearing to move longitudinally in its casing G, in accordance with the thrust of the mechanism.

It will be seen from what has been stated above that each group is an independent whole provided with its controlling parts and that they can be directly connected up coaxially with each other and held together by bolts not shown. In this manner an absolutely complete automotor propelling mechanism, altogether independent of the body of the vehicle for which it is intended, is obtained.

By introducing the ball joint into the socket bearing fitted to the front cross-bar of the body of the vehicle and by fixing the back springs on to the supports of the back axle-tree, a motor vehicle ready for immediate service is obtained in a few minutes. For economical transport each group can be packed separately and the mounting is effected by simply placing these groups together without any adjusting being necessary and only necessitates a few hours work.

It is of course understood that the body of the vehicle rests by means of springs on any front axle-tree whatsoever and that it is provided with the steering gear for controlling the same.

What we claim and desire to secure by Letters Patent is,—

1. A motor mechanism for vehicles composed of a series of separate independent casings each containing its own mechanism, the ends of the casings being provided at the circumference with tongue and groove joints, and having journaled in their ends coaxially with the tongue and groove a series of separate, independent-driving shaft units adapted to engage automatically at their ends in driving relation, the casings when bolted together at their ends forming a continuous rigid straight line connection between the cranking shaft and the back axle-tree.

2. A motor mechanism for vehicles composed of a series of separate independent casings each containing its own mechanism, the casings being provided on their abutting circumferences with tongue and groove joints, and having journaled in their ends, co-axially with the tongue and groove, a series of independent driving shaft units adapted to engage automatically at their ends in driving relation, the casings when bolted together, forming a continuous rigid straight line connection between the cranking shaft and the vehicle hind wheel, the continuous casing being suspended, entirely independently of the wagon frame at one end by a universal joint attached to the front cross-bar of the vehicle body and at the other end by the back axle-tree.

In witness whereof we have hereunto set our hands in presence of two witnesses.

ELIE LACOSTE.
BATTMANN.

Witnesses:
 VICTOR PONS,
 DEAN B. MASON.